May 15, 1928.
F. S. MORGAN
SLUICE BOX TRAP
Filed July 27, 1926
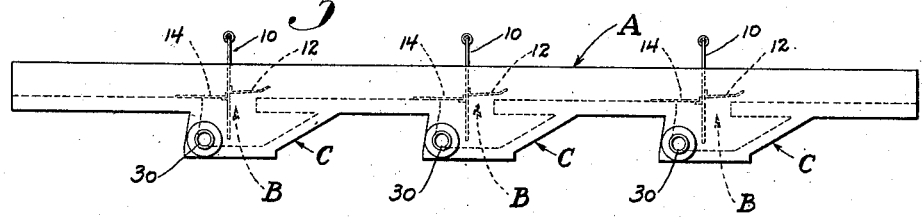
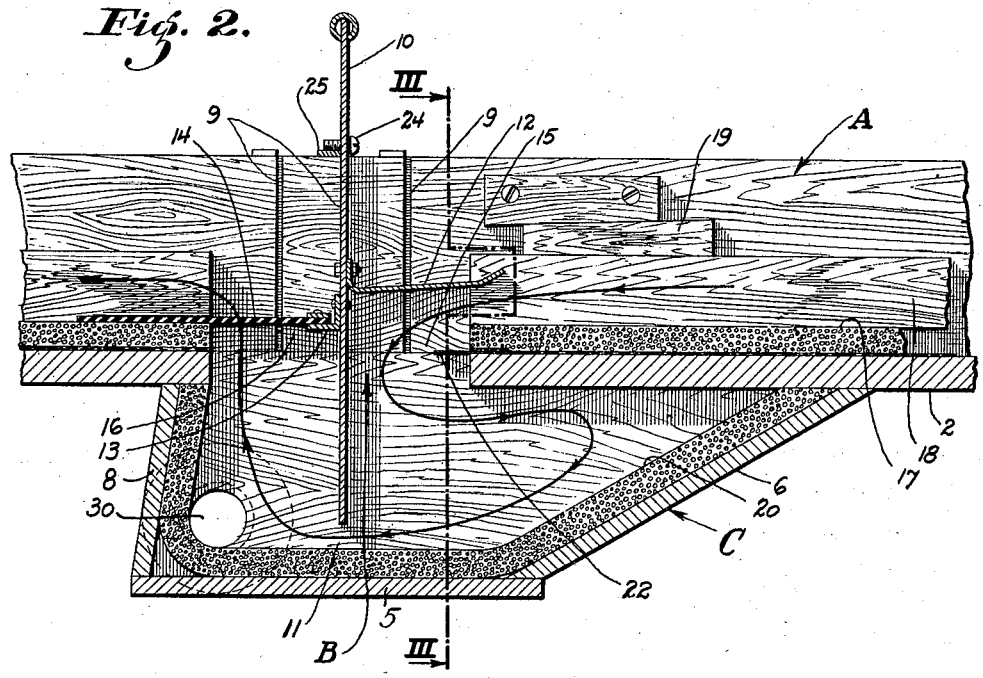
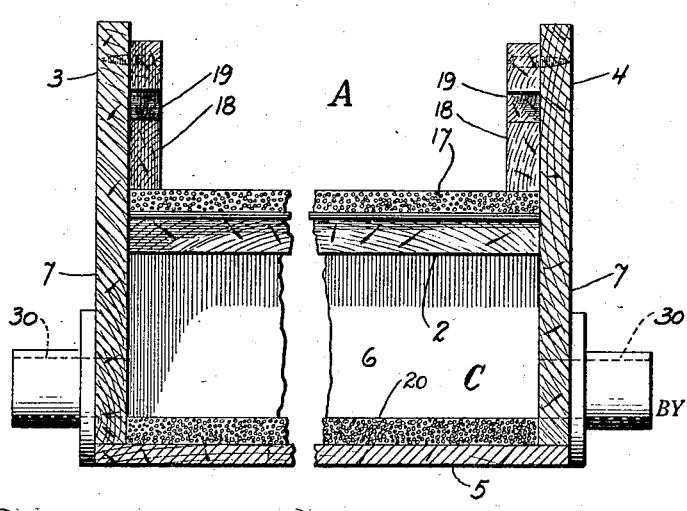
INVENTOR.
Frank S. Morgan.
BY Townsend, Loftus & Ahlstedt
ATTORNEYS.

Patented May 15, 1928.

1,670,206

UNITED STATES PATENT OFFICE.

FRANK S. MORGAN, OF BERKELEY, CALIFORNIA.

SLUICE-BOX TRAP.

Application filed July 27, 1926. Serial No. 125,270.

This invention relates to an apparatus for separating fine metal particles and the like from sand and ore pulp, etc., and particularly to a trap to be used in conjunction with sluice boxes or with the type of apparatus shown in my former patent, entitled Apparatus for separating fine metal particles from sand and ore pulps, Patent Number 1,557,499, issued October 13th, 1925.

The object of the present invention is to generally improve and simplify the construction and operation of traps of the character described; to provide a trap in which the packing of concentrates is avoided; to provide a trap which presents a comparatively large area consisting of a plurality of inclined surfaces over which the water and material to be concentrated is directed; to provide a baffle member which co-operates with the inclined surfaces and whereby reversal of the flow and eddy actions are set up to promote precipitation or lodging of concentrates; to provide a trap which may be lined with a resilient material such as sponge rubber or the like to retain the precipitated concentrates; to provide means whereby a boiling action and dislodgment of the concentrates is substantially prevented and further to provide a trap which is accessible and may be readily cleaned from time to time.

The invention is shown by way of illustration in the accompanying drawings in which:

Figure 1 is a side elevation of a sluice box showing the application of the trap, Figure 2 is an enlarged central vertical longitudinal section of a portion of the sluice and one of the traps, Figure 3 is a cross section of the sluice taken on the line 3—3 of Figure 2.

Referring to the drawings in detail and particularly to Figures 1 and 2, "A" indicates a standard form of sluice box consisting of a bottom section 2 and side sections 3 and 4.

Formed in the bottom section is one or more transverse openings generally indicated at "B" and positioned below the bottom section and secured thereto is a boxlike structure generally indicated at "C". This boxlike structure forms a trap and the opening "B" in the bottom of the sluice forms a communication therewith.

The box or trap consists of a bottom section 5, a front inclined section 6, side sections 7 and an end section 8. The inclined section 6 is preferably disposed on an angle of approximately 30° with relation to the sluice, while the end bottom section 2 of the sluice, while the end section 8 is disposed on an angle of substantially 85° with relation to the bottom section of the sluice.

Formed in the side sections 3 and 4 of the sluice box are two or more parallel vertically disposed grooves 9 and adapted to be received and guided by the grooves is a baffle plate, generally indicated at 10. This baffle plate extends crosswise of the sluice box and the trap "C" and its lower portion is slightly elevated with relation to the bottom section 5 of the trap to form a discharge passage 11.

Mounted on the forward or upper side of the baffle plate is a deflecting plate 12 and mounted on the lower side of the plate is an angle bar 13 to which is secured a sheet rubber flap 14.

The baffle plate 10 divides the opening "B" in the bottom of the sluice box into two openings such as indicated at 15 and 16. The water and material to be concentrated flow downwardly through the sluice box in the direction of the arrow a and pass under the deflating plate 12.

The water and material then strike the forward side of the baffle plate 10 and the direction or flow of water or material is reversed as shown by the arrow. The water and material is again reveresd by the bottom section 2 of the sluice box and by the inclined section 6 and is thus directed through the opening 11 below the baffle member against the end section 8 and is then directed upwardly through the opening 16 in the lower portion of the sluice box from where it continues to flow, to the next trap chamber or to a point of discharge as the case may be.

In actual operation, the bottom of the sluice box is preferably lined with a sponge rubber matting such as indicated at 17. This matting forms a concentrating surface, the function of which is that of catching and retaining fine metal particles or concentrates. The rubber matting is held down by side cleats 18 and wedges 19, as illustrated in Figures 2 and 3. The bottom section 5 and the end sections 6 and 8 of the trap chamber are also lined with sponge rubber as shown at 20 and any concentrates which pass the matting in the upper portion of the sluice are thus given an opportunity to lodge in the trap chamber. Such a lodging action is promoted due to the reversal of flow of water and material therethrough and the eddy actions set up and experience has shown that practically all concentrates escaping from the sluice proper are caught and lodged in the sponge matting disposed in the trap chamber. The velocity of the water and material passing through the trap chamber may be regulated to a more or less extent by an adjustable cross plate 22 and also by vertical adjustment of the baffle member or plate 10, as such adjustment increases or decreases the area of the opening 11.

The cross plate 22 is nothing more or less than a flat plate laid on the bottom of the sluice box, at the forward edge of the opening 15. The plate may be extended by pushing it forward of the sponge rubber matting or by pushing it back and under the matting. The area of the opening 15 is in other words increased or decreased and this together with the opening 11 controls, to a large extent, the velocity and flow of water and material through the trap chamber.

The plate 22 is secured by the matting in the cleats 18 and wedges 19 and as such may be readily adjusted from time to time. The velocity of the water is also controlled to a more or less extent by the sheet rubber flap 14, but its main action is that of a throttle member to prevent boiling action in the part of the trap indicated at 16. Any suitable vertical adjustment may be provided in connection with the baffle plate 10. In this instance, the vertical edges of the plate are perforated to receive pins or screws 24. These screws rest on a cross bar 25 and by raising or lowering the plate 10 and inserting the screws a simple and ready adjustment is obtained.

In actual operation, it has been found that the sponge rubber matting placed in the trap forms a resilient lining which not only retains such concentrates as may escape from the sluice proper, but it also serves the function of aerating the water and pulp. This combined action of resiliency and aeration prevents packing in the trap and it insures retention of the concentrates or values and furthermore, permits large tonnages of material to be handled.

The several adjustments provided insure the proper flow and velocity for different grades of material handled, thereby taking care of sands and other materials which may contain concentrates or other valuable products.

The plates 12 and 22 fitted near the bottom of the sluice box and projected over the aperture 15 perform two functions, first that of regulating the flow of water and secondly that of determining to a large extent the angle at which the water is diverted into the trap.

The rubber flap 14 has sufficient length and width to completely cover the discharge outlet 16 from the trap and as such functions to retard a too rapid discharge of the pulp, that is, it retards the flow of the pulp to such an extent that the values may settle in the pores or cells of the sponge rubber and the valve or flap furthermore, prevents any boiling action which might dislodge the values.

It should also be noted that the side walls 7 of the trap chamber are provided with cleanup outlets such as shown at 30. Cleaning up of an apparatus of this character is effected by applying a needle spray of water under moderate pressure to the surface of the sponge rubber matting indicated at 17. This spray applied to the surface boils out the value from one cell to the next until all of the values are discharged in the trap chamber. The rubber matting contained may be removed by lifting out the baffle plate 10 and the plates 12 and 14 attached thereto and any values that remain may be washed out through the openings 30. The cleaning up operation is accordingly simple and quickly accomplished and an inducement is thus made to clean up oftener than is usually the case.

While certain features of the present invention are more or less specifically described and illustrated I wish it understood that varying changes may be resorted to within the scope of the appended claim, also that the materials and finish of the several parts employed may be such as different uses or applications may demand.

Having thus described my invention, what I claim and desire to secure by Letters Patent is:—

The combination with a sluice box having a transverse opening formed in its bottom, of a trap box disposed below the sluice bottom and in communication with the transverse opening, a baffle plate disposed transversely of the sluice box and extending downwardly through the opening in the trap, said plate forming an inlet to the trap on its upper side and a discharge for the trap on its lower side, means whereby the baffle plate may be vertically adjusted, a horizontally disposed flexible rubber flap attached to the lower side of the baffle plate and covering the discharge side of the trap, and an adjustable plate extending crosswise of the sluice and movable to or away from the upper side of the baffle plate to increase or decrease the area of the inlet to the trap.

FRANK S. MORGAN.